United States Patent
Higaki et al.

(10) Patent No.: US 10,657,703 B2
(45) Date of Patent: May 19, 2020

(54) IMAGE PROCESSING APPARATUS AND IMAGE PROCESSING METHOD

(71) Applicant: CANON KABUSHIKI KAISHA, Tokyo (JP)

(72) Inventors: Yoshinari Higaki, Yokohama (JP); Tomohiro Nishiyama, Tama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/729,463

(22) Filed: Oct. 10, 2017

(65) Prior Publication Data

US 2018/0101979 A1 Apr. 12, 2018

(30) Foreign Application Priority Data

Oct. 12, 2016 (JP) .................. 2016-201256

(51) Int. Cl.
| | |
|---|---|
| *G06T 15/00* | (2011.01) |
| *G06T 15/20* | (2011.01) |
| *G06T 7/55* | (2017.01) |
| *G06T 7/33* | (2017.01) |
| *G06T 7/70* | (2017.01) |
| *G06T 7/60* | (2017.01) |

(52) U.S. Cl.
CPC ............ *G06T 15/205* (2013.01); *G06T 7/344* (2017.01); *G06T 7/55* (2017.01); *G06T 7/60* (2013.01); *G06T 7/70* (2017.01)

(58) Field of Classification Search
CPC ......... G06T 7/55; G06T 7/344; G06T 15/205; G06T 7/60; G06T 7/70

USPC .......................................................... 345/419
See application file for complete search history.

(56) References Cited

U.S. PATENT DOCUMENTS

| | | | | |
|---|---|---|---|---|
| 7,046,840 | B2 * | 5/2006 | Chang ..................... | G06T 17/10 345/420 |
| 8,773,508 | B2 * | 7/2014 | Daniel ...................... | G06T 7/55 348/42 |
| 9,053,550 | B2 * | 6/2015 | Li ............................ | G06T 1/20 |

(Continued)

FOREIGN PATENT DOCUMENTS

| | | |
|---|---|---|
| EP | 2239708 A2 | 10/2010 |
| GB | 2458305 A | 9/2009 |

(Continued)

OTHER PUBLICATIONS

Kolev K, Klodt M, Brox T, Cremers D. Propagated photoconsistency and convexity in variational multiview 3d reconstruction. InProceedings of the First International Workshop on Photometric Analysis for Computer Vision—PACV 2007 Oct. 14, 2007 (pp. 8-p). Inria.*

(Continued)

*Primary Examiner* — Phu K Nguyen
(74) *Attorney, Agent, or Firm* — Canon USA, Inc., IP Division

(57) ABSTRACT

An image processing apparatus generating geometric data of an object includes an obtaining unit configured to obtain a plurality of images of the object, each image captured from different viewpoints, a generating unit configured to generate geometric data of the object from the images obtained by the obtaining unit, and a correcting unit configured to correct the geometric data based on a reliability of at least a part of the geometric data generated by the generating unit.

12 Claims, 9 Drawing Sheets

(56) References Cited

U.S. PATENT DOCUMENTS

| | | | |
|---|---|---|---|
| 9,818,234 B2* | 11/2017 | Nezamabadi | G02F 1/1334 |
| 10,074,160 B2* | 9/2018 | Kim | G06T 5/002 |
| 10,074,214 B2* | 9/2018 | La Fleur | G06T 7/55 |
| 10,097,811 B2* | 10/2018 | Liu | G06T 7/85 |
| 10,217,281 B2* | 2/2019 | Yu | G06T 7/246 |
| 10,403,030 B2* | 9/2019 | Murray | G01C 11/025 |
| 10,430,922 B2* | 10/2019 | Savvides | G06T 7/73 |
| 2004/0104935 A1 | 6/2004 | Williamson | |
| 2005/0088515 A1 | 4/2005 | Geng | |
| 2016/0027179 A1 | 1/2016 | Takama | |

FOREIGN PATENT DOCUMENTS

| | | |
|---|---|---|
| JP | 4839237 B2 | 12/2011 |
| WO | 2013/174671 A1 | 11/2013 |

OTHER PUBLICATIONS

Cremers D, Kolev K. Multiview stereo and silhouette consistency via convex functionals over convex domains. IEEE Transactions on Pattern Analysis and Machine Intelligence. Jun. 2011;33(6):1161-74.*

Kolev K, Klodt M, Brox T, Cremers D. Continuous global optimization in multiview 3d reconstruction. International Journal of Computer Vision. Aug. 1, 2009;84(1):80-96.*

Neurotechnology, SentiSculpt technology for 3D object model creation from sets of photos; Apr. 9, 2015; 0:00-1:46; https://www.youtube.com/watch?v=lewLNiWfN1U&feature=youtu.be.*

Moons T, Van Gool L, Vergauwen M. 3D reconstruction from multiple images part 1: Principles. Foundations and Trends® in Computer Graphics and Vision. Mar. 22, 2010;4(4):287-404.*

A. Hilton; "Scene Modelling from sparse 3D data"; Image and Vision Computing vol. 23, No. 10, 2005, pp. 900-920.

* cited by examiner

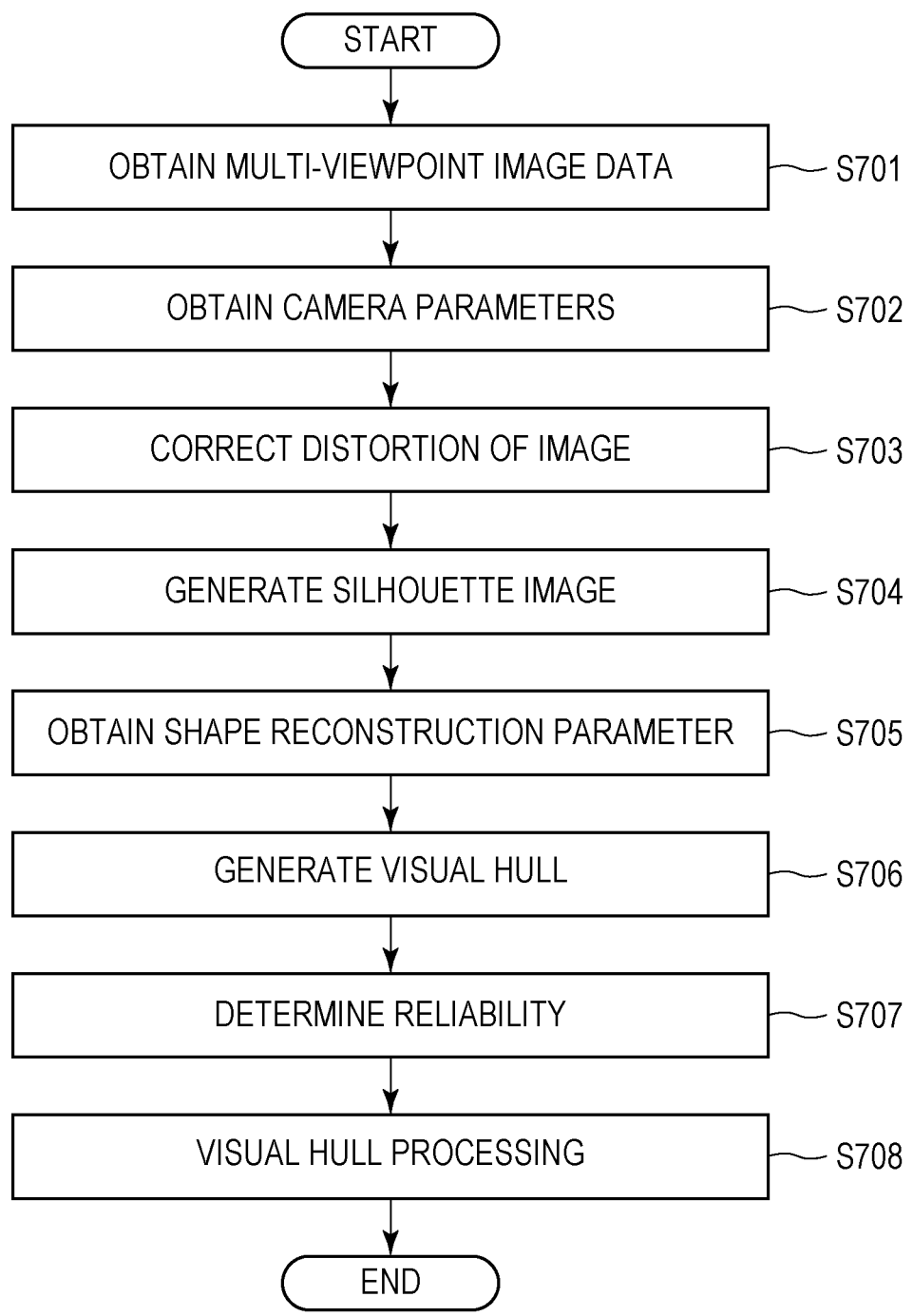

IMAGE PROCESSING APPARATUS AND IMAGE PROCESSING METHOD

BACKGROUND OF THE INVENTION

Field of the Invention

The present invention relates to image processing for generating geometric data of an object.

Description of the Related Art

The Silhouette Volume Intersection has been known as a method for quickly generating (reconstructing) a three-dimensional shape of an object by using a multi-viewpoint image obtained by a plurality of cameras having different viewpoints.

According to the Silhouette Volume Intersection, a silhouette image representing a contour line of an object is used so that a shape of the object can be obtained quickly in a stable manner. On the other hand, in a case where an object having a shield or a defect, for example, cannot be observed completely, a fundamental problem may occur that a three-dimensional shape approximate to the real object cannot be generated. Against the fundamental problem, Japanese Patent No. 4839237 discloses a method for generating a three-dimensional shape of a partially lacking object by complementing the lacking part of the object.

However, according to some complementation method therefor, a three-dimensional shape different from a real shape of the object may be generated. For example, according to the Silhouette Volume Intersection, in a case where a lower number of viewpoints (valid cameras) capture an object or in a case where the valid cameras are distributed unevenly, the shape of the object generated with the lower number of viewpoints may be complemented to be excessively inflated. The technology disclosed in Japanese Patent No. 4839237 may not generate a three-dimensional shape of a part corresponding to the valid cameras the number of which is matched with the number of all cameras.

SUMMARY OF THE INVENTION

An image processing apparatus generating geometric data of an object includes an obtaining unit configured to obtain a plurality of images of the object, each image captured from different viewpoints, a generating unit configured to generate geometric data of the object from the images obtained by the obtaining unit, and a correcting unit configured to correct the geometric data based on a reliability of at least a part of the geometric data generated by the generating unit.

Further features of the present invention will become apparent from the following description of exemplary embodiments with reference to the attached drawings.

BRIEF DESCRIPTION OF THE DRAWINGS

FIG. 7 is a flowchart illustrating a flow of processing to be performed by the image processing apparatus according to the first embodiment.

DESCRIPTION OF THE EMBODIMENTS

Embodiments of the present invention will be described with reference to drawings. It is not intended that the following embodiments limit the present invention and that all of combinations of features according to the embodiments are necessary for the present invention. Like numbers refer to like parts throughout.

First Embodiment

According to a first embodiment, in response to a user's operation through a GUI (graphical user interface), an unnecessary part of geometric data (data representing a three-dimensional shape of an object) is deleted based on the number of valid cameras.

Figure 1:
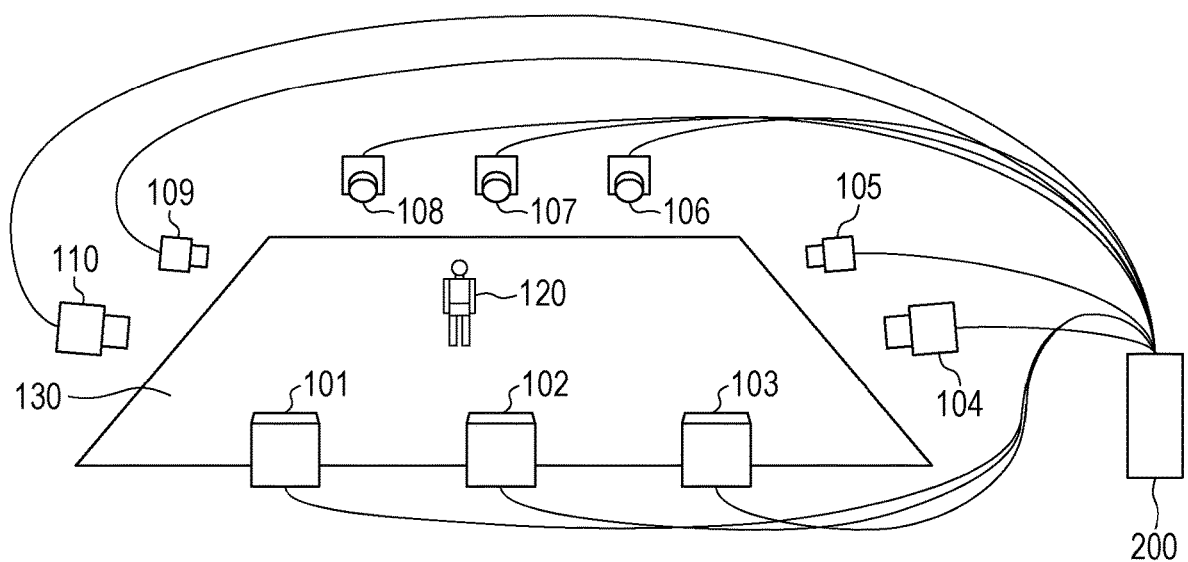
FIG. 1 illustrates a camera layout according to first embodiment.

FIG. 1 illustrates a layout example of cameras included in a camera group. An example will be described in which ten cameras are placed in a stadium where Rugby is played. A player as an object 120 exists on a field 130 where a game is played, and ten cameras 101 to 110 are arranged to surround the field 130. Each of the cameras in the camera group is set to have a camera orientation, a focal length, and exposure control parameters appropriate for catching, within an angle of view, the whole field 130 or a region of interest within the field 130. Illustrating a stadium in FIG. 1, the technology according to this embodiment is applicable to any arbitrary scene in which cameras are arranged to surround an object to generate (hereinafter, reconstruct) geometric data of the object.

Figure 2:
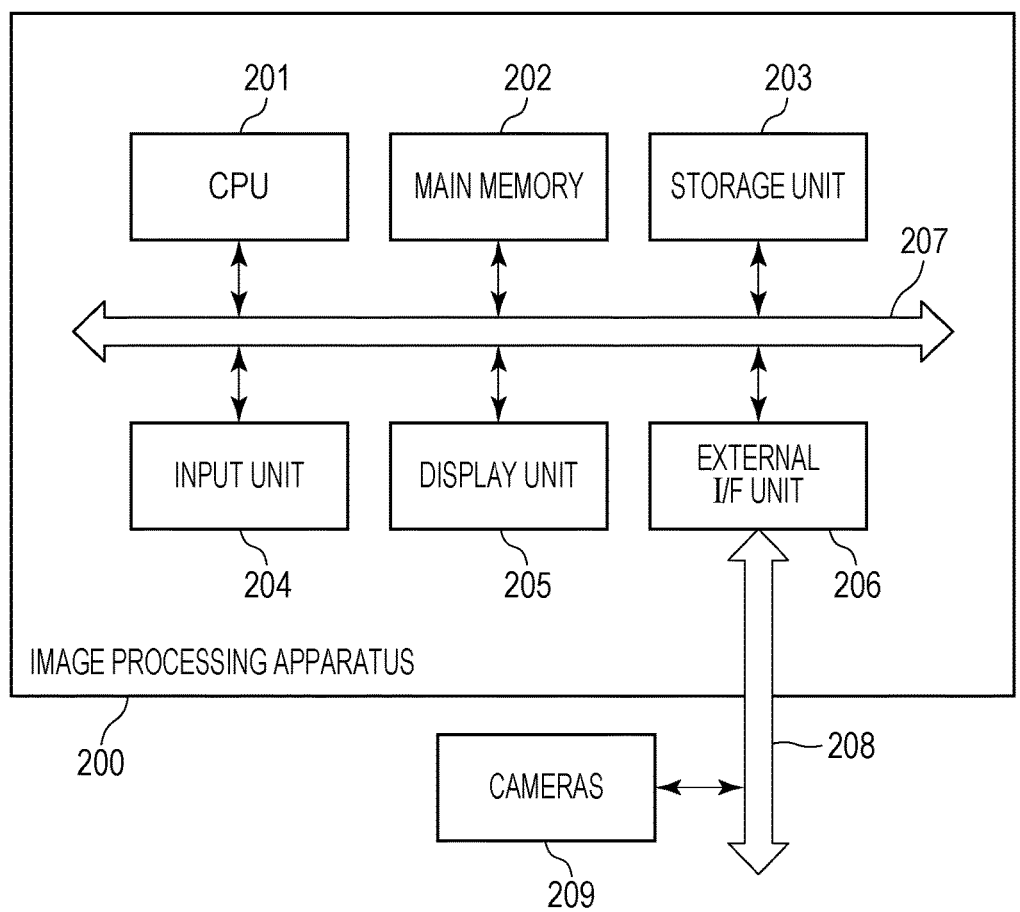
FIG. 2 illustrates a configuration of a multi-viewpoint video system according to the first embodiment.

FIG. 2 illustrates an example of a configuration of a multi-viewpoint video system according to this embodiment. The multi-viewpoint video system illustrated in FIG. 2 includes an image processing apparatus 200 and a camera group 209. The camera group 209 corresponds to the cameras 101 to 110 in FIG. 1. The image processing apparatus 200 includes a CPU 201, a main memory 202, a storage unit 203, an input unit 204, a display unit 205, and an external I/F unit 206 which are connected through a bus 207. The CPU 201 is a processing unit configured to generally control the image processing apparatus 200 and is configured to execute programs stored in the storage unit 203, for example, for performing various processes. The main memory 202 may temporarily store data and parameters to be used for performing processes and provides a work area to the CPU 201. The storage unit 203 may be a large-capacity storage device configured to store programs and data usable for GUI display and may be a nonvolatile memory such as a hard disk and a silicon disk. The input unit 204 is a device such as a keyboard, a mouse, an electronic pen, and a touch panel, and is configured to receive an operation input from a user. The display unit 205 may be a liquid crystal panel and is configured to display a GUI relating to reconstruction of geometric data. The external I/F unit 206 is connected to the camera group 209 over a LAN 208 and is configured to transmit and receive video data and control signal data. The bus 207 connects these units and is configured to perform data transfer.

The camera group 209 is connected to the image processing apparatus 200 over the LAN 208 and is configured to start and stop an image capturing, change a camera setting (such as a shutter speed and an aperture), and transfer captured video data based on a control signal from the image processing apparatus 200.

The system configuration may include various constituent elements other than the aforementioned units, but such constituent elements will not be described because they are not focused in this embodiment.

Figure 3:
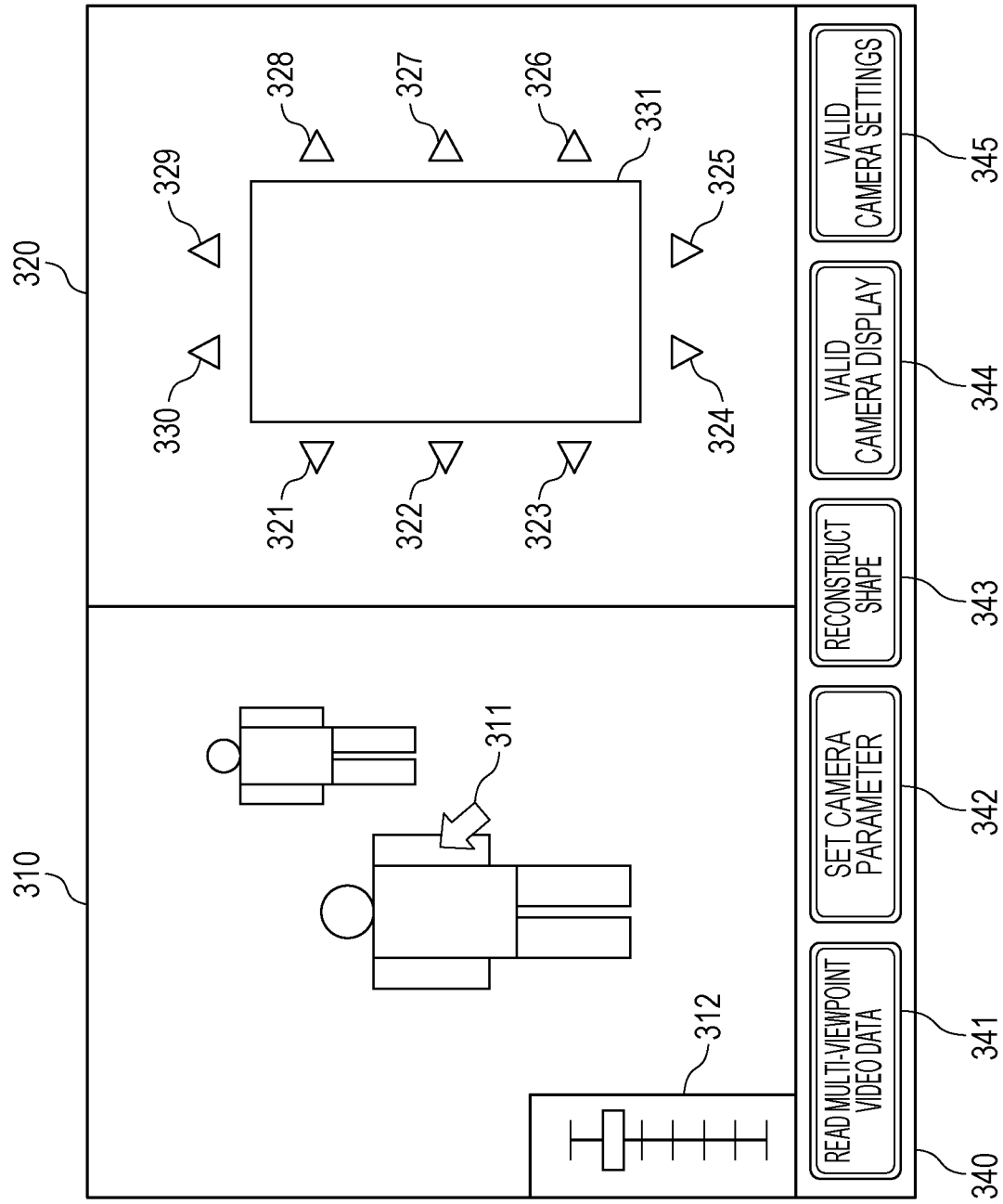
FIG. 3 illustrates a GUI according to the first embodiment.

FIG. 3 illustrates an example of a GUI display screen usable for reconstructing geometric data according to this embodiment. FIG. 3 illustrates a basic display screen of the GUI display screen and includes a reconstructed shape display region 310, a valid camera display/setting region 320, and an operation button region 340.

The reconstructed shape display region 310 includes a pointer 311 and a slider bar 312 and can display geometric data of an object (or data representing a three-dimensional shape of an object) from an arbitrary viewpoint and at an arbitrary magnification. In order to change the display magnification for geometric data, the slider bar 312 may be dragged to move. The viewpoint for geometric data may be changed in response to an operation performed on geometric data through the input unit 204, such as dragging the data by using a mouse and pressing an arrow key. The pointer 311 may be superimposed on geometric data so that one point on the geometric data can be designated.

The valid camera display/setting region 320 includes camera icons 321 to 330 schematically indicating cameras and a field general form 331 schematically representing the field 130. The number and layout of camera icons are matched with the number and layout of actually placed cameras. Illustrating ten cameras corresponding to FIG. 1 as an example, the number and layout of camera icons may be different from those of FIG. 3 if the number and layout of cameras are different. Referring to FIG. 3, the camera 101 and the camera 102 correspond to the camera icon 321 and the camera icon 322, respectively. The camera icons are displayed as having one of two states of ON/OFF states, whose meaning will be described below. One of the two states may be designated by a user by operating the input unit 204.

The operation button region 340 includes a multi-viewpoint video data read button 341, a camera parameter setting button 342, a shape reconstruct button 343, a valid camera display button 344, and a valid camera setting button 345. When the multi-viewpoint video data read button 341 is pressed, a window is displayed for designating multi-viewpoint video data to be used for generating geometric data. When the camera parameter setting button 342 is pressed, a window is displayed for obtaining a camera parameter such as an intrinsic parameter or an extrinsic parameter of a camera. A camera parameter here may be set by reading a file storing numerical values or may be set based on a value input by a user on the displayed window. Here, the term "intrinsic parameter" refers to a coordinate value at a center of an image or a focal length of a lens in a camera, and the term "extrinsic parameter" refers to a parameter representing a position or an orientation of a camera. When the shape reconstruct button 343 is pressed, a window opens for setting a parameter relating to shape reconstruction, and geometric data are generated by using multi-viewpoint video data as described above.

A GUI display screen as described above may be used by two different methods. A first method displays generated geometric data on the reconstructed shape display region 310 and then displays valid cameras corresponding to a specific position of the geometric data on the valid camera display/setting region 320. A user may press the valid camera display button 344 to select the first method. Here, the term "valid camera" refers to a camera capturing one point (such as one point designated by a user) on geometric data. Geometric data may be represented by various forms such as a set of voxels, a point group, and a mesh (polygon). One point on geometric data may be represented as a voxel or three-dimensional coordinate values. The following descriptions handle a voxel as a minimum unit of geometric data. When a user designates an arbitrary one point on geometric data by using the pointer 311 in the reconstructed shape display region 310, a part representing valid cameras is displayed as having an ON state on the valid camera display/setting region 320. Thus, a user can interactively check valid cameras at arbitrary positions on geometric data.

A second method designates an arbitrary valid camera to have an ON state on the valid camera display/setting region 320 so that a partial region of the geometric data viewable from the valid camera can be displayed on the reconstructed shape display region 310. A user may press the valid camera setting button 345 to select the second method. A partial region of geometric data may be displayed alone or may be superimposed on another part of the geometric data for comparison. Thus, a user can interactively check which camera is valid for reconstructing a shape of a region of interest. A user can interactively check a part corresponding to geometric data which can be estimated from a specific camera (visual field). A user may also interactively verify how a specific region of interest is estimated from a specific camera (visual field).

Thus, a user can adjust a parameter for generating geometric data by checking through a GUI a relationship between a valid camera and geometric data to be generated by the camera. Parameters usable for generating geometric data may include a minimum number (threshold value) of valid cameras. A relationship between the Silhouette Volume Intersection being a scheme for generating geometric data and threshold values will be described below.

Figure 4A:
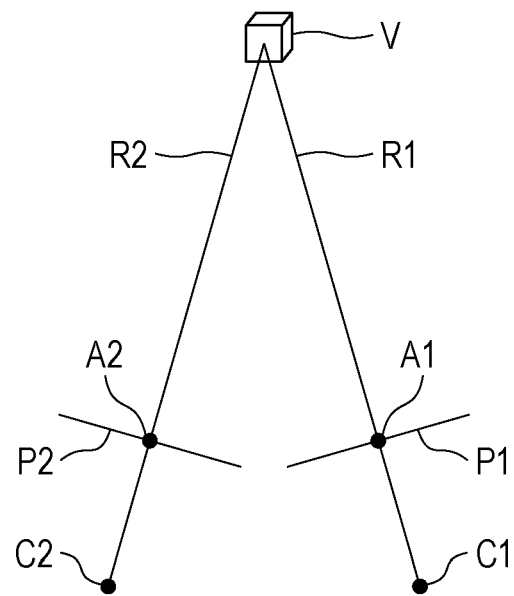
FIGS. 4A and 4B are conceptual diagrams illustrating a Silhouette Volume Intersection.
Figure 4B:
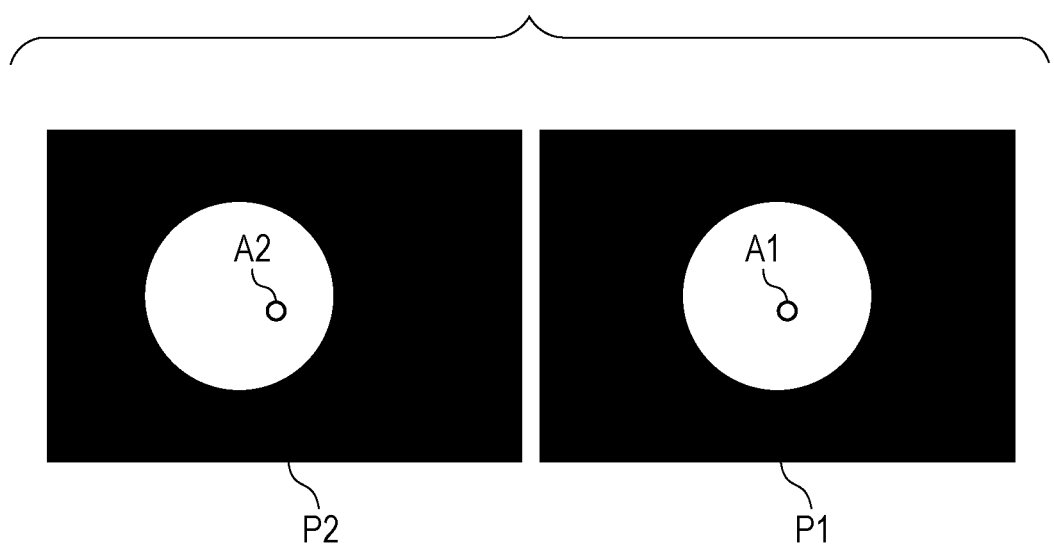

Because the fundamental principle of the Silhouette Volume Intersection is disclosed in Japanese patent No. 4839237, detail descriptions thereon will be omitted herein. The volume intersection method (VIM) is known as one implementation of the Silhouette Volume Intersection. FIG. 4A illustrates a principle of VIM. Referring to FIG. 4A, C1 and C2 are camera centers, P1 and P2 are image planes of cameras, V is a voxel, R1 and R2 are rays from V to C1 and C2, A1 and A2 are intersection points (projected Vs) of R1 and R2 and the image planes. FIG. 4B is a schematic diagram illustrating a silhouette image obtained from two cameras. According to VIM, one point A1 within a silhouette in a silhouette image obtained from the base camera C1 is selected, and the point A1 is projected into a three-dimensional space based on the camera parameters and an arbitrary depth value. One point projected into the three-dimensional space corresponds to one voxel V. Next, whether a point A2 obtained by projecting the voxel V to an image plane P2 of another camera (reference camera) positions within the silhouette in the silhouette image obtained from the reference camera is determined. As illustrated in FIG. 4B, if the point A2 positions within the silhouette, the voxel V is kept. If it positions outside the silhouette on the other hand, the voxel V is deleted. A series of these processes may be repeated by changing the coordinates of the point A1, the depth value, the base camera, and the reference camera so that a set (Visual Hull) of connected voxels having a convex shape can be formed. The principle of shape reconstruction according to VIM has been described up to this point.

Figure 5A:
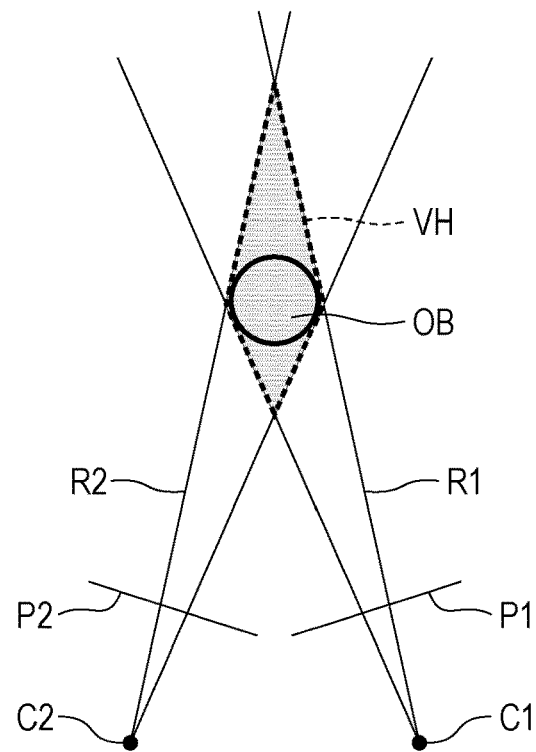
FIGS. 5A and 5B are conceptual diagrams illustrating a relationship between viewpoints and a Visual Hull.
Figure 5B:
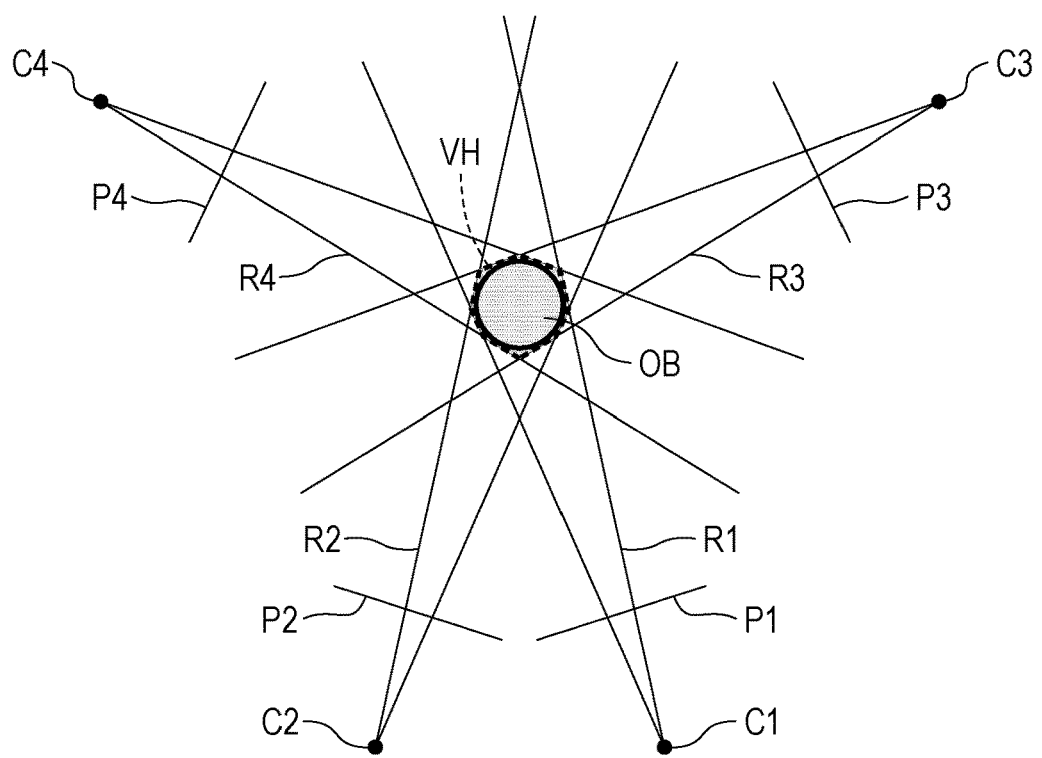

Because the Silhouette Volume Intersection is based on data on a silhouette having a reduced amount of information, geometric data can be generated robustly and quickly while the accuracy decreases when the number of valid cameras is low. FIG. 5A is a schematic diagram of a result of a shape reconstruction according to the Silhouette Volume Intersection for an object with two valid cameras. Referring to FIG. 5A, C1 and C2 are camera centers, P1 and P2 are image planes of the cameras, R1 and R2 are rays passing through a silhouette outline of the object, OB is a section of a real object, and VH is a Visual Hull obtained by projecting the silhouette on the image planes P1 and P2. The VH has a shape elongating in the vertical direction of FIG. 5A and is deviated from the real object. On the other hand, FIG. 5B is a schematic diagram illustrating a result of a shape reconstruction according to the Silhouette Volume Intersection for the same object with four valid cameras. Referring to FIG. 5B, C1 to C4 are camera centers, P1 to P4 are image planes of the cameras, R1 to R4 are rays passing through a silhouette outline of the object, OB is a section of a real object, VH is a Visual Hull obtained by projecting the silhouettes on the planes P1 to P4. Referring to FIG. 5B, as the number of valid cameras increases, the approximation of the shape of VH to OB increases or the accuracy increases. As the number of valid cameras increases, the reliability of the reconstructed Visual Hull increases. According to this embodiment based on the characteristics, Visual Hulls with the number of valid cameras equal to or higher than a predetermined threshold value are selectively kept from a plurality of reconstructed Visual Hulls so that highly reliable geometric data can be acquired. A Visual Hull with the number of valid cameras lower than the predetermined threshold value may be deleted, or an approximation model may be applied thereto. The approximation model may be obtained by learning in advance from geometric data of an object or a similar target or may be a relatively simple shape represented by a function. The approximation model may be described by a two-dimensional or three-dimensional function. Adopting a high threshold value may increase the accuracy of the resulting geometric data while many Visual Hulls are to be deleted, for example. On the other hand, adopting a low threshold value can keep many Visual Hulls while a less accurate part may occur. Because of existence of such a trade-off relationship, the threshold value can be changed in accordance with a given scene according to this embodiment. The comparison processing between the number of valid cameras and the threshold value may be performed in units of a single voxel or a plurality of voxels instead of in units of a Visual Hull. For example, the number of valid cameras may be determined for each voxel, and a voxel with the number of valid cameras lower than the threshold value may only be deleted.

Returning to the descriptions on operations to be performed on the GUI display screen, a user may adjust the threshold value and check a result of generation of geometric data based on the relationship between the number of valid cameras and accuracy as described above. According to the first method, the geometric data displayed on the reconstructed shape display region 310 of the GUI display screen is checked with reference to a predetermined threshold value. If there is a part not accurate enough, a user may check the number of valid cameras of a highly accurately generated part on the valid camera display/setting region 320 and may reset the threshold value based on it to generate geometric data again. This can result in improved accuracy of geometric data of the target part. The initial value of the threshold value may be set based on the number of cameras, the layout relationship among the cameras, the size of the stadium, and the shape of the stadium, for example. For example, when fewer cameras are placed in the stadium, a lower threshold value may be set so that a Visual Hull may not be deleted easily. When many cameras are placed in the stadium on the other hand, a higher threshold value may be set so that highly accurate geometric data can be generated.

Figure 6:
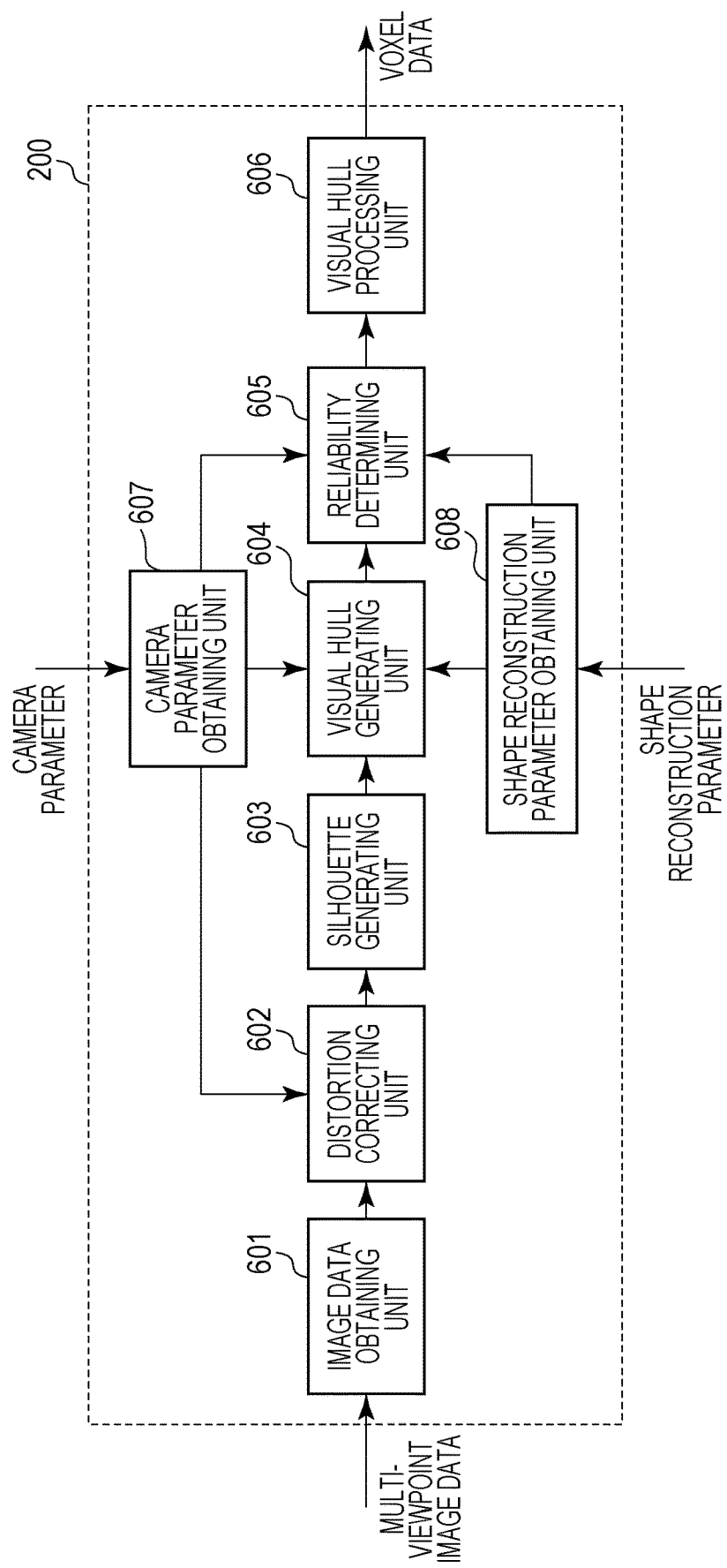
FIG. 6 is a block diagram illustrating a configuration of an image processing apparatus according to the first embodiment.

Processing to be performed in the image processing apparatus 200 according to the first embodiment will be described with reference to a functional block diagram illustrated in FIG. 6 and a flowchart illustrated in FIG. 7. The image processing apparatus 200 includes an image data obtaining unit 601, a distortion correcting unit 602, a silhouette generating unit 603, a Visual Hull generating unit 604. The image processing apparatus 200 further includes a reliability determining unit 605, a Visual Hull processing unit 606, a camera parameter obtaining unit 607, and a shape reconstruction parameter obtaining unit 608. An example according to this embodiment will mainly be described in which functions corresponding to the blocks illustrated in FIG. 6 are implemented by the CPU 201 in the image processing apparatus 200. However, a part or all of the functions illustrated in FIG. 6 may be executed by dedicated hardware. For example, the functions of the distortion correcting unit 602, the silhouette generating unit 603, and the Visual Hull generating unit 604 in FIG. 6 may be implemented by dedicated hardware while the other functions may be implemented by the CPU 201. A flow of processing to be performed by these components will be described below.

In step S701, the image data obtaining unit 601 obtain multi-viewpoint image data through the external I/F unit 206.

In step S702, the camera parameter obtaining unit 607 obtains camera parameters such as an intrinsic parameter, an extrinsic parameter, and a distortion parameter of the camera. Here, the term "intrinsic parameter" refers to coordinate values at an image center or a focal length of a lens in a camera, and the term "extrinsic parameter" refers to a parameter indicating a position or an orientation of the camera. While an extrinsic parameter is described here with a position vector of a camera at world coordinates and a rotation matrix, it may be described according to any other scheme. A distortion parameter represents a distortion degree of a lens in a camera. A camera parameter may be estimated by "structure from motion" based on multi-viewpoint image data or may be calculated by a calibration performed in advance by using a chart.

In step S703, the distortion correcting unit 602 performs a distortion correction on the multi-viewpoint image data based on a distortion parameter of the camera.

In step S704, the silhouette generating unit 603 generates a silhouette image from the multi-viewpoint image data in which the distortion is corrected. The term "silhouette image" refers to a binary image having a region with an object represented in white (pixel value=255) and a region without the object represented in black (pixel value=0). Silhouette image data are generated by performing an existing scheme such as background separation and object cutout on multi-viewpoint image data.

In step S705, the shape reconstruction parameter obtaining unit 608 obtains a shape reconstruction parameter. The shape reconstruction parameter may be set by a user through the input unit 204 every time or may be prestored and be read out from the storage unit 203.

In step S706, the Visual Hull generating unit 604 generates a Visual Hull by using the camera parameters and the silhouette image. In order to perform this, the Silhouette Volume Intersection may be used. In other words, the Visual Hull generating unit 604 in step S706 generates geometric data (data representing a three-dimensional shape of the object).

In step S707, the reliability determining unit 605 determines a reliability in units of a single voxel or a plurality of voxels or for each Visual Hull. In other words, the reliability determining unit 605 determines a reliability of the geometric data (data representing a three-dimensional shape of the object) generated by the Visual Hull generating unit 604 in step S706. The reliability may be based on the number of valid cameras. When the reliability is based on the number of valid cameras, the reliability determining unit 605 identifies a voxel or a Visual Hull with the number of valid cameras lower than a predetermined threshold value as a voxel or a Visual Hull with low reliability.

In step S708, the Visual Hull processing unit 606 performs correction processing on the voxel or Visual Hull identified in step S707. The correction processing may include deleting and model application. In other words, based on the reliability, the Visual Hull processing unit 606 corrects the geometric data (data representing a three-dimensional shape of the object) generated by the Visual Hull generating unit 604 in step S706.

As described above, based on the reliability, the image processing apparatus 200 according to this embodiment corrects the geometric data (data representing a three-dimensional shape of the object) generated by the Silhouette Volume Intersection. This configuration can prevent excessive inflation of a part of an object with a lower number of valid cameras, for example. Thus, a three-dimensional shape approximate to a real shape of an object can be generated. According to this embodiment, geometric data generated by a series of the aforementioned processes are displayed on the GUI display screen. According to this embodiment, a user can interactively search an optimum threshold value through the GUI. However, the threshold value may be a fixed value.

Second Embodiment

Another implementation example of the Silhouette Volume Intersection according to a second embodiment will be described. Space Carving Method (SCM) is known as one implementation of the volume intersection method. SCM projects an arbitrary one voxel V to image planes of all cameras and keeps the voxel V if all of the projected points are within a silhouette corresponding to each of the cameras and deletes the voxel V if even one point is off the silhouette. This process may be performed on all voxels within a certain range so that a set of the kept voxels can form a Visual Hull. VIM is suitable for parallel processing while SCM consumes a less space of memory. Thus, one of them suitable for a given apparatus configuration may be used.

Third Embodiment

Figure 8A:
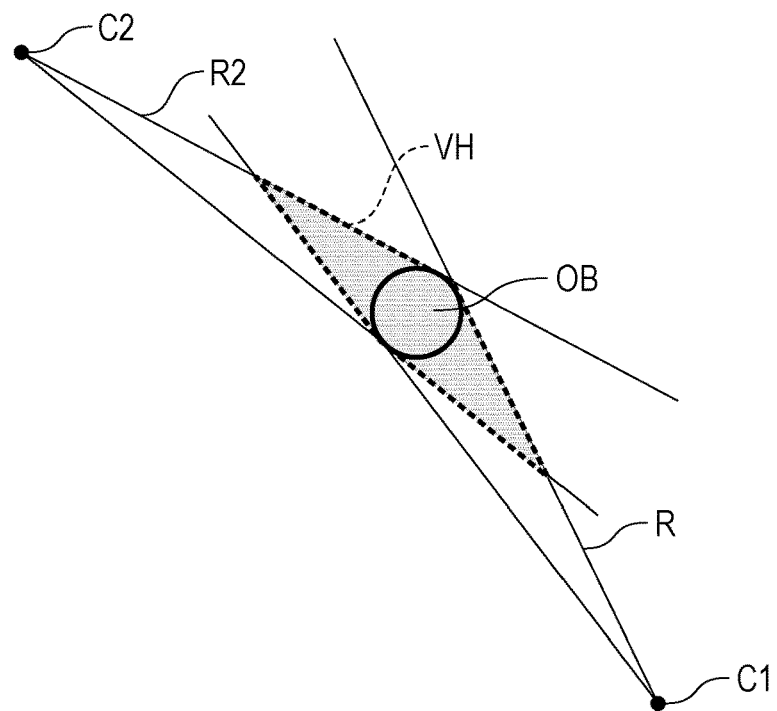
FIGS. 8A and 8B illustrate distributions of valid cameras.
Figure 8B:
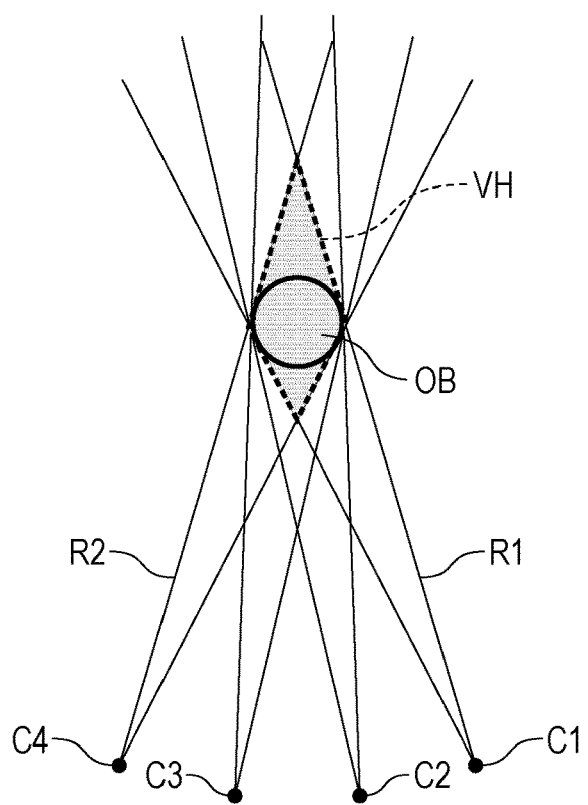

A method for determining a reliability according to this embodiment will be described in detail. Hereinafter, the expression a "valid camera for the voxel of interest" is defined as a "camera capturing an image of the voxel of interest". FIG. 8A is a schematic diagram of a result of generation of geometric data based on the Silhouette Volume Intersection of an object with two valid cameras, and FIG. 8B is a schematic diagram in a case where the number of valid cameras is equal to four and the valid cameras are distributed partially unevenly. Referring to FIG. 8A, C1 to C4 are camera centers, R1 to R4 are rays passing through a silhouette outline of an object, OB is a real section of an object, and VH is a Visual Hull. Unlike FIGS. 5A and 5B, the image planes P1 and P2 are not illustrated for convenience of illustration.

FIG. 8A illustrates a lower number of valid cameras, like the first embodiment, while FIG. 8B illustrates an equal number of valid cameras to that in FIG. 5B though valid cameras are distributed unevenly. Therefore, the Visual Hull is deviated from the real shape.

Therefore, one or both of the number of valid cameras and the distribution of the valid cameras may be used as an index or indices for determining a reliability for a voxel. A maximum value of the angle made by optical axes of two valid cameras, for example, may be used as a value indicating a distribution of valid cameras. A physical distance of a valid camera, for example, may be used as another example of the value indicating a distribution of valid cameras. Any other value may be used if it can indicate such a distribution. In order to determine a reliability of all Visual Hulls representing an object, an average value of reliabilities of voxels belonging to the applicable Visual Hulls. Instead of such an average value, a maximum value, a minimum value or the median of the reliability may be used. In order to identify Visual Hulls of an object, a silhouette of a specific object in an image may be identified, or Visual Hulls may be clustered in a space. The position of an object may be identified by using information regarding a zenith camera, and a set of voxels present within a predetermined distance around the position may be identified as Visual Hulls of the object. However, the reliability of all of Visual Hulls may be determined by any other method. A reliability in consideration of the number of valid cameras and a weighted average of a valid camera distribution may be adopted.

Fourth Embodiment

According to a fourth embodiment, a method for correcting a shape will be described in detail. An example will be described in which the reliability of all Visual Hulls representing a specific object is used to perform processing. If it is determined that the reliability of Visual Hulls is lower than a threshold value, three patterns may mainly be considered including deleting all of the Visual Hulls, deleting a part of the Visual Hulls, or replacing the Visual Hulls by a different approximation model. Because the case where all of Visual Hulls are to be deleted is clear, the other two patterns will be described with reference to FIGS. 9A and 9B. Though an example in which an object is a human will be described below, the same processing may be performed for an object not being a human.

Figure 9A:
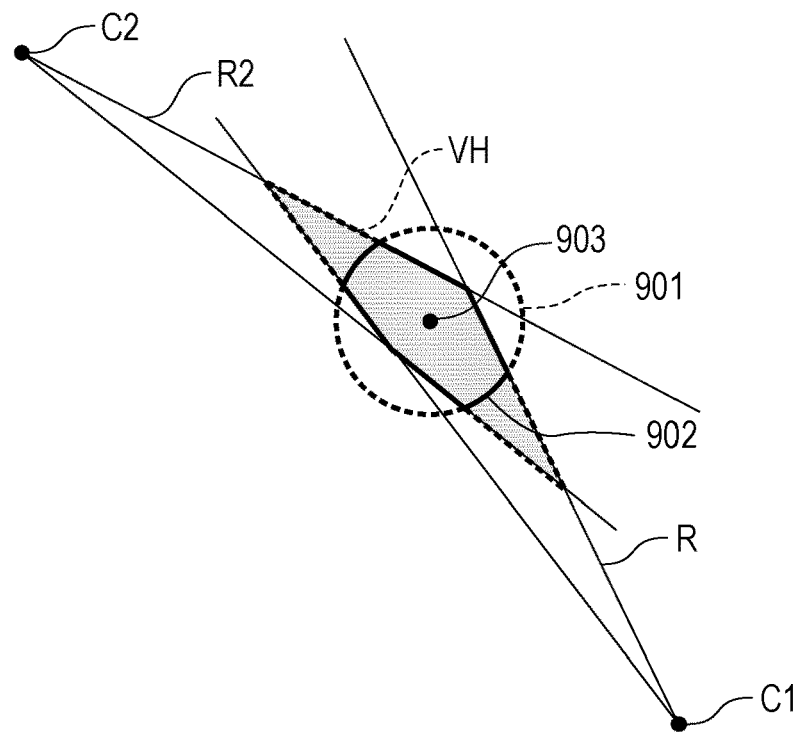
FIGS. 9A and 9B illustrate a method for correcting a shape.

FIG. 9A is a conceptual diagram in a case where a part of a Visual Hull is deleted. FIG. 9A illustrates a top view of a cylinder 901 having a diameter and a height which can contain one person. It is assumed here that the diameter and height of the cylinder are equal to two meters, for example. A solid line 902 indicates a common part (or common region) between a Visual Hull and the cylinder 901. The part may be used as a shape to delete an unnecessarily extending part. FIG. 9A illustrates a center position 903 of a bottom plane of the cylinder, and the center position 903 is matched with the barycentric position of the figure obtained by projecting Visual Hulls to the field. The cylinder may be placed at a position other than such a barycentric position if there is a higher possibility that an object exists there. Alternatively, any other solid than a cylinder may be used such as a sphere or a rectangular parallelepiped. As an alternative deletion method without using a solid, voxels may be projected to an image, and a photo-consistency may be calculated. If it is equal to or lower than a threshold value, the voxels may be deleted. In this case, a reliability for each voxel may be used to perform the deletion.

Figure 9B:
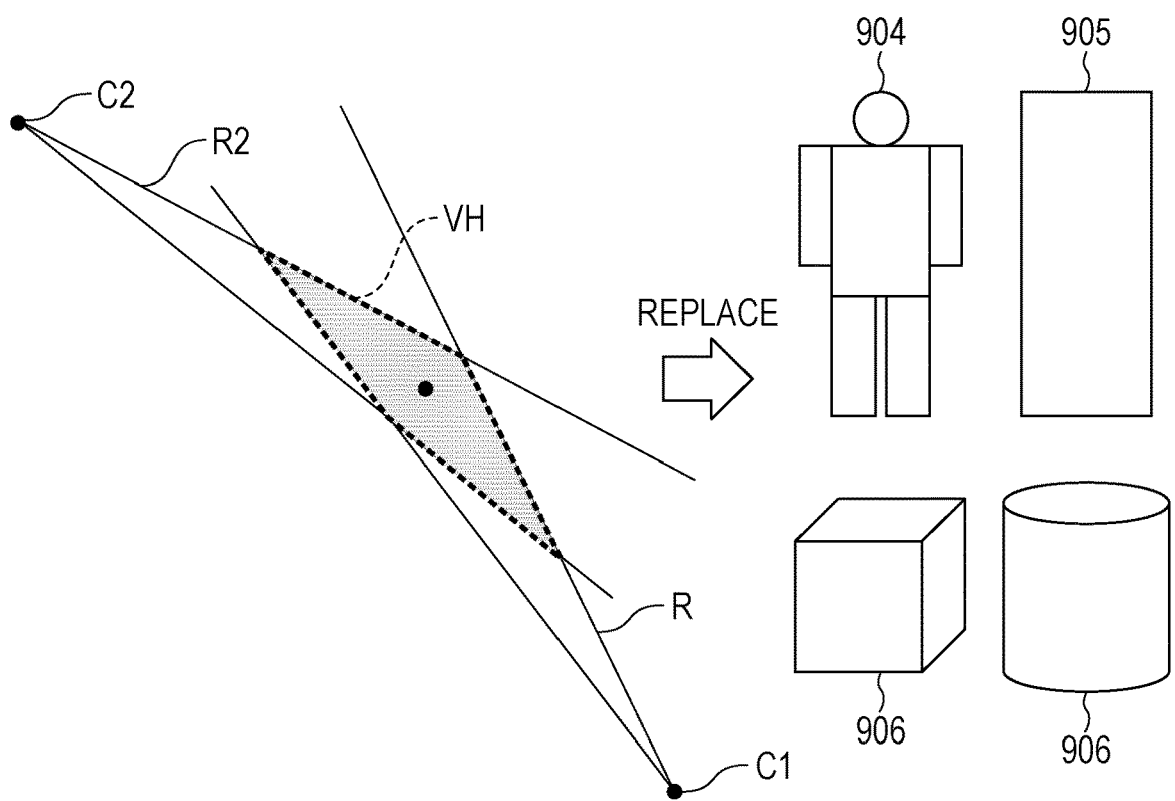

FIG. 9B is a conceptual diagram in a case where a Visual Hull is replaced by a different approximation model. FIG. 9B illustrates a general human figure model 904, a plate 905 called a billboard, and any other simple solid 906. If a billboard is adopted, the height of the billboard is approximately equal to the height of a human. If a simple solid is adopted, it size may be determined in the same manner as illustrated in FIG. 9A. The layout location of the solid may be determined in the same manner as in FIG. 9A.

Fifth Embodiment

A user may use a GUI to correct a Visual Hull with a reliability lower than a threshold value according to the first to fourth embodiments. However, when multi-viewpoint moving-image data are input, it may not be realistic that a user corrects a shape on each of frames. According to this embodiment, the processing is automatically performed.

Figure 10:
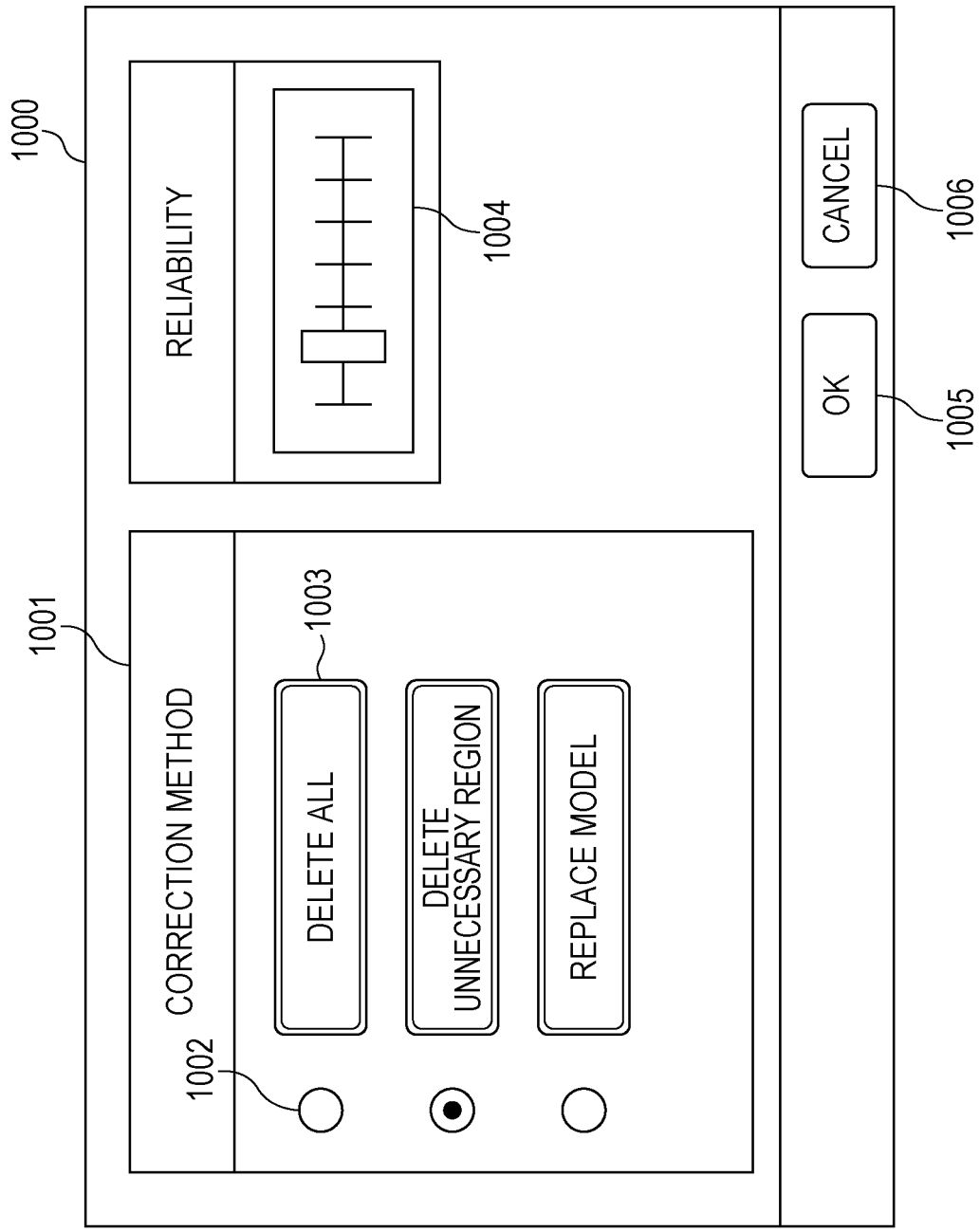
FIG. 10 illustrates a GUI according to a fifth embodiment.

FIG. 10 illustrates an example of a GUI display screen according to a fifth embodiment. FIG. 10 illustrates a basic display screen of the GUI display screen and includes a display region 1000, a correction method display region 1001, a slide bar 1004, an OK button 1005, and a Cancel button 1006. The correction method display region 1001 includes a radio button 1002 and a correction method 1003. A user may use the radio button 1002 to select a scheme for correcting a shape. The slider bar 1004 may be dragged to move so that a threshold value for reliability can be adjusted. When the OK button 1004 is pressed, a preset reliability threshold value and correction method are used to execute correction processing on geometric data in all image frames. A GUI for selecting a target frame may be displayed so that correction processing can be executed on geometric data in an image frame selected by a user. When the Cancel button 1005 is pressed, the display region 1000 is closed.

According to the aforementioned first to fifth embodiments, a three-dimensional shape having a shape more approximate to the shape of a real object can be generated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-201256 filed Oct. 12, 2016, which is hereby incorporated by reference herein in its entirety.

What is claimed is:

1. An image processing apparatus comprising:
an obtaining unit configured to obtain image data based on capturing of a plurality of image capturing apparatuses;
a generating unit configured to generate shape data representing a three-dimensional shape of an object based on the image data obtained by the obtaining unit; and
a processing unit configured to process the shape data generated by the generating unit, based on information representing a number of image capturing apparatuses that capture an area corresponding to at least a part of the shape data,
wherein the processing unit is configured to delete the at least a part of the shape data based on the number of image capturing apparatuses that capture the area corresponding to the at least a part of the shape data being lower than a threshold value.

2. The image processing apparatus according to claim 1, wherein the processing unit is configured to process the shape data generated by the generating unit, further based on information representing positional distribution of image capturing apparatuses that capture an area corresponding to the at least a part of the shape data.

3. The image processing apparatus according to claim 1, wherein the processing unit is configured not to delete the at least a part of the shape data based on the number of image capturing apparatuses that capture the area corresponding to the at least a part of the shape data being equal to or higher than the threshold value.

4. The image processing apparatus according to claim 1, wherein the threshold value is lower than the number of image capturing apparatuses.

5. The image processing apparatus according to claim 1, wherein the threshold value is determined based on the number of image capturing apparatuses.

6. The image processing apparatus according to claim 5, wherein a threshold value in a case where the number of image capturing apparatuses is a first value is larger than a threshold value in a case where the number of image capturing apparatuses is a second value smaller than the first value.

7. An image processing apparatus comprising:
   an obtaining unit configured to obtain image data based on capturing of a plurality of image capturing apparatuses;
   a generating unit configured to generate shape data representing a three-dimensional shape of an object based on the image data obtained by the obtaining unit; and
   a processing unit configured to process the shape data generated by the generating unit, based on information representing a number of image capturing apparatuses that capture an area corresponding to at least a part of the shape data,
   wherein the processing unit is configured to replace the at least a part of the shape data by an approximation model, based on the number of image capturing apparatuses that capture the area corresponding to the at least a part of the shape data being lower than a threshold value.

8. The image processing apparatus according to claim 7, wherein the approximation model is a model described by a two-dimensional or three-dimensional function.

9. The image processing apparatus according to claim 7, wherein the approximation model is a model based on a shape of a human figure.

10. The image processing apparatus according to claim 7, wherein the approximation model is a model based on a size of a human figure.

11. An image processing method for generating shape data representing a three-dimensional shape of an object, the image processing method comprising:
   obtaining image data based on capturing of a plurality of image capturing apparatuses;
   generating shape data representing a three-dimensional shape of the object based on the image data; and
   processing the shape data based on information representing a number of image capturing apparatuses that capture an area corresponding to at least a part of the shape data,
   wherein the at least part of the shape data based on the number of image capturing apparatuses that capture the area corresponding to the at least a part of the shape data being lower than a threshold value is deleted.

12. A non-transitory computer-readable medium storing a computer program for causing a computer to execute an image processing method for generating shape data representing a three-dimensional shape of an object, the image processing method comprising:
   obtaining image data based on capturing of a plurality of image capturing apparatuses;
   generating shape data representing a three-dimensional shape of the object based on the image data; and
   processing the shape data based on information representing a number of image capturing apparatuses that capture an area corresponding to at least a part of the shape data,
   wherein the at least a part of the shape data based on the number of image capturing apparatuses that capture the area corresponding to the at least a part of the shape data being lower than a threshold value is deleted.

* * * * *